(12) United States Patent
Kalaimani

(10) Patent No.: US 11,023,959 B2
(45) Date of Patent: Jun. 1, 2021

(54) SYSTEM AND METHOD FOR ORDERING ITEMS FROM A VEHICLE

(71) Applicant: Toyota Connected North America, Inc., Plano, TX (US)

(72) Inventor: Senthilkumar Gopal Kalaimani, Frisco, TX (US)

(73) Assignee: Toyota Connected North America, Inc., Plano, TX (US)

( * ) Notice: Subject to any disclaimer, the term of this patent is extended or adjusted under 35 U.S.C. 154(b) by 134 days.

(21) Appl. No.: 16/247,944

(22) Filed: Jan. 15, 2019

(65) Prior Publication Data

US 2020/0226667 A1   Jul. 16, 2020

(51) Int. Cl.

| | |
|---|---|
| G06Q 30/00 | (2012.01) |
| G06Q 30/06 | (2012.01) |
| G06Q 50/12 | (2012.01) |
| G10L 15/22 | (2006.01) |
| G10L 15/183 | (2013.01) |
| G06F 3/0482 | (2013.01) |
| G01C 21/36 | (2006.01) |
| G07C 5/00 | (2006.01) |
| G06F 3/16 | (2006.01) |

(52) U.S. Cl.
CPC ..... *G06Q 30/0641* (2013.01); *G01C 21/3679* (2013.01); *G06F 3/0482* (2013.01); *G06F 3/167* (2013.01); *G06Q 50/12* (2013.01); *G07C 5/008* (2013.01); *G10L 15/183* (2013.01); *G10L 15/22* (2013.01); *G10L 2015/223* (2013.01)

(58) Field of Classification Search
None
See application file for complete search history.

(56) References Cited

U.S. PATENT DOCUMENTS 6,574,603 B1   6/2003  Dickson et al.
9,928,833 B2 *  3/2018  Prokhorov .............. G10L 15/30
(Continued)

OTHER PUBLICATIONS

Danni Santana, "Domino's Adds In-Vehicle Ordering for Customers" Skift Table. Retrieved from https://table.skift.com/2019/03/25/dominos-adds-in-vehicle-ordering-for-customers/ (Year: 2019).*
(Continued)

*Primary Examiner* — Naeem U Haq
(74) *Attorney, Agent, or Firm* — Christopher G. Darrow; Darrow Mustafa PC

(57) ABSTRACT

In one embodiment, example systems and methods relate to ordering food from a vehicle. A driver or a passenger of a vehicle indicates that they would like to order food from the vehicle by speaking a command, or by making a selection on a display associated with the vehicle. In response to the indication, the vehicle determines one or more restaurants that are near the vehicle, or that are near the route being traveled by the vehicle. After the driver or passenger selects a restaurant, the vehicle loads a restaurant specific natural language understanding model that is associated with the restaurant. As the driver or passenger speaks their order, the restaurant specific natural language understanding model is used to process the audio and generate an order. The order and an estimated time of arrival of the vehicle is provided electronically to the restaurant.

19 Claims, 7 Drawing Sheets

(56) References Cited

U.S. PATENT DOCUMENTS

| | | | |
|---|---|---|---|
| 10,074,128 B2* | 9/2018 | Colson | G01C 21/3697 |
| 2007/0088624 A1 | 4/2007 | Vaughn et al. | |
| 2009/0089183 A1 | 4/2009 | Afram et al. | |
| 2010/0114734 A1 | 5/2010 | Guili et al. | |
| 2013/0138515 A1* | 5/2013 | Taniguchi | G06Q 10/087 |
| | | | 705/15 |
| 2014/0089061 A1 | 3/2014 | Vitale | |
| 2014/0200879 A1* | 7/2014 | Sakhai | G06Q 50/12 |
| | | | 704/9 |
| 2015/0324890 A1 | 11/2015 | Wilson et al. | |
| 2017/0046800 A1* | 2/2017 | Zomet | G06Q 50/12 |
| 2018/0253805 A1* | 9/2018 | Kelly | G06Q 20/322 |
| 2019/0108566 A1* | 4/2019 | Coleman | G06Q 30/0633 |
| 2020/0182652 A1* | 6/2020 | Cruz | G01C 21/3697 |

OTHER PUBLICATIONS

No Author, "Domino's® and Xevo Deliver In-Car Ordering to New Vehicles in 2019" PRNewswire Mar. 25, 2019 (Year: 2019).*

Julie Littman, "Domino's adds in-car ordering to its tech lineup" Restaurant Dive. Retrieved from https://www.restaurantdive.com/news/dominos-adds-in-car-ordering-to-its-tech-lineup/551216/ (Year: 2019).*

* cited by examiner

SYSTEM AND METHOD FOR ORDERING ITEMS FROM A VEHICLE

TECHNICAL FIELD

The subject matter described herein relates, in general, to a system and method for ordering food from a vehicle, and in particular, to using restaurant-specific natural language understanding models to process food orders in autonomous and non-autonomous vehicles.

BACKGROUND

Drivers or passengers in vehicles may desire to purchase items such as food from one or more restaurants that are near her vehicle. For example, a driver may desire to pick up dinner from a fast food restaurant on her way home. In another example, a driver may desire to get a cup of coffee to drink while she drives to work.

Currently, if a driver desires to locate a nearby restaurant, the driver uses a map application provided by the vehicle to search for a nearby restaurant, and is then presented with a phone number for the restaurant. The driver then uses her personal cellular phone to call the restaurant and order the food. At a later time, the driver may then pick up her food at the restaurant.

There are several drawbacks associated with the vehicle ordering system described above. First, the driver must use her phone, or a phone associated with the vehicle, to interact with the restaurant. Second, the driver must physically enter the restaurant (i.e., leave her vehicle) to receive the order. Third, there is no way for the driver or the restaurant to consider the current distance of the vehicle from the restaurant when placing or fulfilling the order. As a result, the food may be prepared well ahead of the driver's arrival, which may result in cold food for the driver.

SUMMARY

In one embodiment, example systems and methods relate to ordering food from a vehicle. A driver or a passenger of a vehicle indicates that she would like to order food from the vehicle by speaking a command, or by making a selection on a display associated with the vehicle. In response to the indication, the vehicle determines one or more restaurants that are near the vehicle, or that are near the route being traveled by the vehicle. After the driver or passenger selects a restaurant, the vehicle loads a restaurant specific voice model that is associated with the restaurant. As the driver or passenger speaks her order, the restaurant specific natural language understanding model is used to process the audio and generate an order. The order and an estimated time of arrival of the vehicle is provided electronically to the restaurant. The restaurant may use the estimated time of arrival to determine when to begin preparing the order to ensure that the order is ready at the approximately the same time that the vehicle arrives. Later, the restaurant can determine that the vehicle has arrived based on an RFID signal associated with the vehicle or based on the license plate of the vehicle. The restaurant may then dispatch the order to the vehicle using a food runner. The vehicle may then facilitate payment for the order using a credit card or other financial instrument associated with the driver or passenger.

In one embodiment, a system for ordering food in a vehicle is disclosed. The system includes one or more processors and a memory communicably coupled to the one or more processors. The memory stores an interface module including instructions that when executed by the one or more processors cause the one or more processors to: retrieve a natural language understanding model associated with a desired restaurant, wherein the natural language understanding model is one of a plurality of natural language understanding models, and each natural language understanding model is associated with a different restaurant of a plurality of restaurants; record voice data from a passenger in the vehicle; and process the recorded voice data using the retrieved natural language understanding model to determine an order for the desired restaurant. The memory further stores a transaction module including instructions that when executed by the one or more processors cause the one or more processors to: provide the determined order to the desired restaurant along with the recorded voice data.

In one embodiment, a method for ordering food in a vehicle is disclosed. The method includes: determining a desired restaurant; retrieving a natural language understanding model associated with the restaurant, wherein the natural language understanding model is one of a plurality of natural language understanding models, and each natural language understanding model is associated with a different restaurant of a plurality of restaurants; recording voice data from a passenger in the vehicle; processing the recorded voice data using the retrieved natural language understanding model to determine an order for the desired restaurant; and providing the determined order to the desired restaurant.

In one embodiment, a non-transitory computer-readable medium for ordering food in a vehicle is disclosed. The non-transitory computer-readable medium includes instructions that when executed by one or more processors cause the one or more processors to: determine a desired restaurant; retrieve a natural language understanding model associated with the restaurant, wherein the natural language understanding model is one of a plurality of natural language understanding models, and each natural language understanding model is associated with a different restaurant of a plurality of restaurants; record voice data from a passenger in the vehicle; process the recorded voice data using the retrieved natural language understanding model to determine an order for the desired restaurant; and provide the determined order to the desired restaurant.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
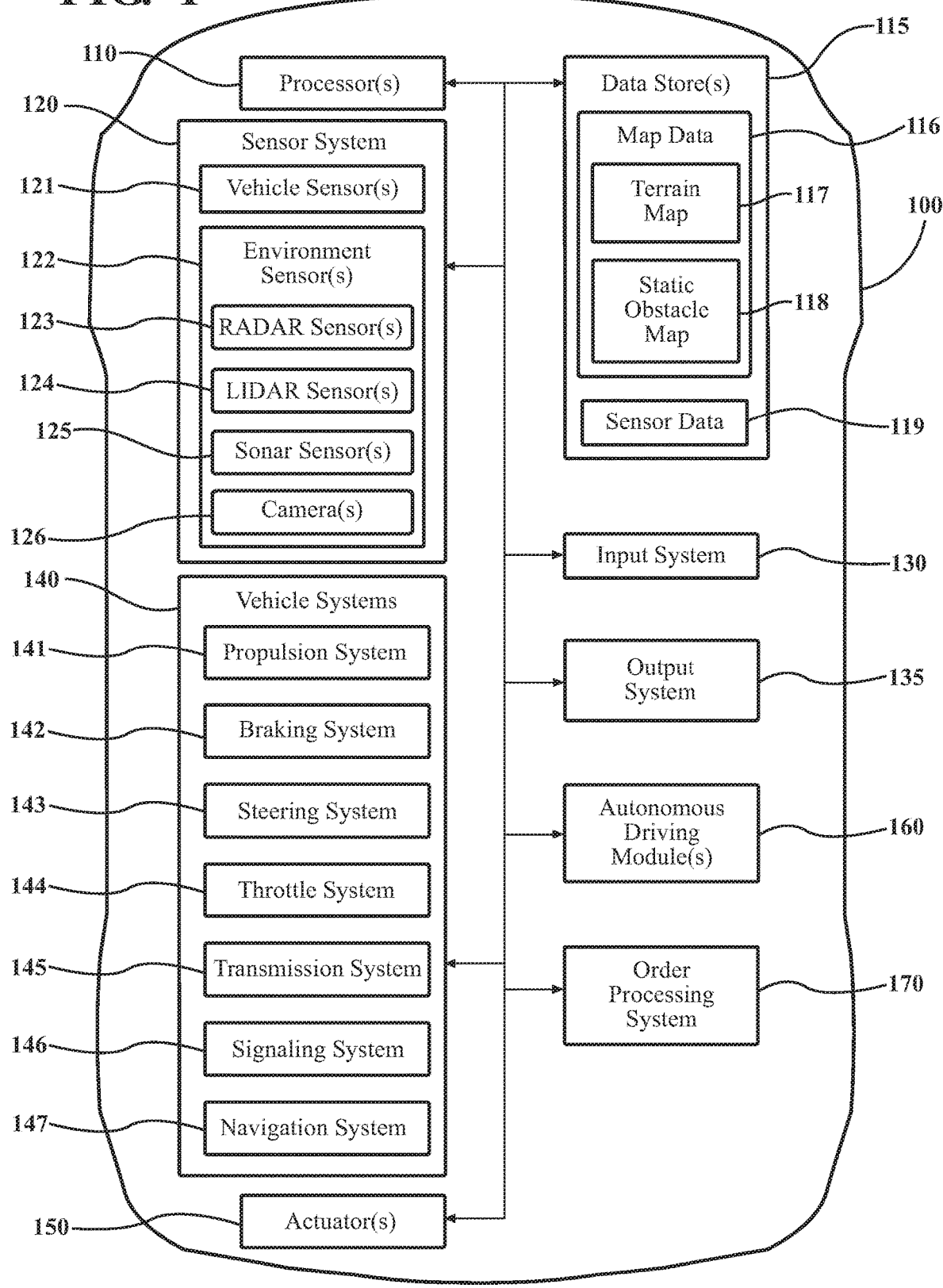
FIG. 1 illustrates one embodiment of a vehicle within which systems and methods disclosed herein may be implemented.

Systems, methods, and other embodiments associated with ordering food and other items from a vehicle are disclosed. An order processing system that allows a passenger to issue commands to a vehicle using natural language is incorporated into a vehicle. As used herein the term "passenger" is meant to refer to any occupant of a vehicle including the driver. In one embodiment, a passenger indicates that she would like to order food from a particular restaurant or type of restaurant. For example, the passenger may speak that she would like to order food from a restaurant such as McDonalds. In another example, the passenger may speak that she would like to order some Chinese food.

In response, the ordering processing system may search for restaurants that meet the spoken requirements of the passenger. The order processing system may search for restaurants that meet the requirements of the passenger and that are either near the location of the vehicle, or near a route being traveled by the vehicle. The order processing system may present the passenger with the matching restaurants, and the passenger may then select a desired restaurant. For example, the order processing system may speak the names and locations of the matching restaurants, and the passenger may speak the name of the desired restaurant.

To facilitate easy ordering for the desired restaurant, the order processing system may retrieve a natural language understanding model specific to the desired restaurant. The natural language understanding model may be trained to recognize the particular menu items and food items offered by the desired restaurant. The passenger may then speak her order to the order processing system, and the order processing system may process the spoken order to generate an order that includes one or more food items. The generated order may then be presented to the restaurant electronically by the order processing system. In addition, the generated order may include an estimated time of arrival of the vehicle so that the restaurant can determine when to best prepare the order to ensure that the order is complete when the vehicle arrives, but does not sit for longer than necessary after being prepared.

Furthermore, the order processing system may further include modules and/or components that can notify a restaurant when the passenger has arrived for her order. These components may include license plate reading cameras and low powered wireless technologies such as RFID, for example. When the passenger has arrived, the order may be automatically brought to the vehicle associated with the passenger by a food runner.

The system for facilitating food ordering from vehicles described herein provided many advantages. First, because a restaurant-specific voice model is used to process the order, the resulting order is more likely to be accurate and the passenger is therefore more likely to use the voice interface for ordering in the future. As may be appreciated, conventional methods for receiving orders from passengers include touch screen interfaces provided by a vehicle or a mobile device. Touch screens require the passenger to look at the interface, which is inherently unsafe when the passenger is also the driver of the vehicle. Second, because the system automatically determines when the passenger has arrived and delivers the order to the passenger in her vehicle, the passenger does not have to enter the restaurant. By not entering the restaurant, or leaving the vehicle, the safety of the passenger is increased and the overall congestion in the restaurant due to order pick-ups is reduced.

With regards to FIG. 1, a vehicle 100 includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes an order processing system 170 that is implemented to perform methods and other functions as disclosed herein relating to ordering food, or other items, from a vehicle 100. The noted functions and methods will become more apparent with a further discussion of the figures.

Figure 2:
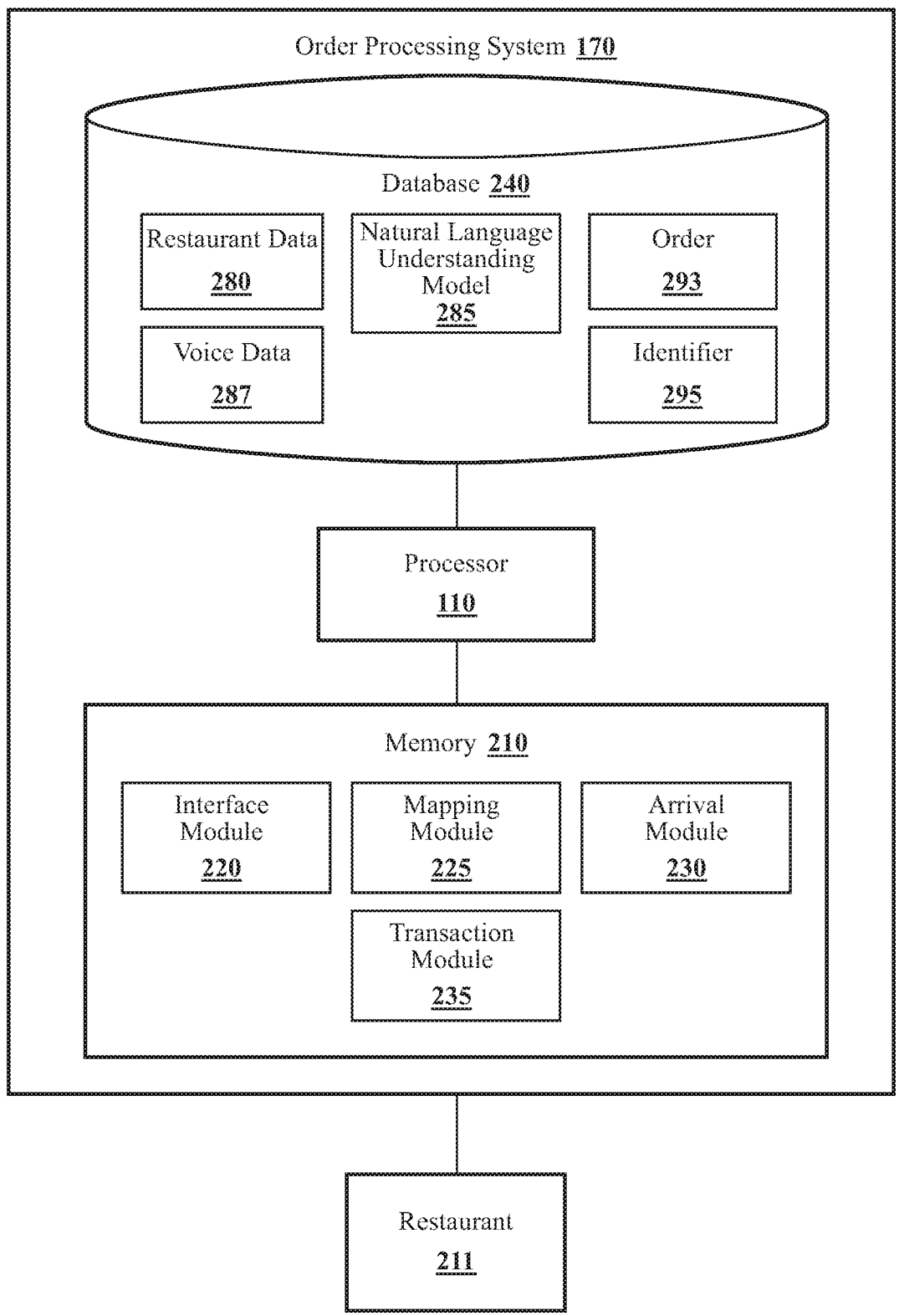
FIG. 2 illustrates one embodiment of an order processing system.

With reference to FIG. 2, one embodiment of the order processing system 170 of FIG. 1 is further illustrated. The order processing system 170 is shown as including a processor 110 from the vehicle 100 of FIG. 1. Accordingly, the processor 110 may be a part of the order processing system 170, the order processing system 170 may include a separate processor from the processor 110 of the vehicle 100, or the order processing system 170 may access the processor 110 through a data bus or another communication path. It should be appreciated, that while the order processing system 170 is illustrated as being a single contained system, in various embodiments, the order processing system 170 is a distributed system that is comprised of components that can be provided as a centralized server, a cloud-based service, and so on.

In one embodiment, the order processing system 170 includes a memory 210 that stores an interface module 220, a mapping module 225, an arrival module 230, and a transaction module 235. The memory 210 is a random-access memory (RAM), read-only memory (ROM), a hard-disk drive, a flash memory, or other suitable memory for storing the modules 220, 225, 230, and 235. The modules 220, 225, 230, and 235 are, for example, computer-readable instructions that when executed by the processor 110 cause the processor 110 to perform the various functions disclosed herein. Moreover, as previously noted, in various embodiments, one or more aspects of the order processing system 170 are implemented as cloud-based services, and so on. Thus, one or more modules of the order processing system 170 may be located remotely from other components and may be implemented in a distributed manner.

Furthermore, in one embodiment, the order processing system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220, 225, 230, and 235 in executing various functions. In one embodiment, the database 240 includes restaurant data 280 along with, for example, other information that is used and/or generated by the modules 220, 225, 230, and 235 such as a natural language understanding model 285, voice data 287, an order 293, and an identifier 295. Of course, in further embodiments, the various information may be stored within the memory 210 or another suitable location.

The interface module 220 is configured to facilitate the ordering of food or food items from one or more restaurants 211 by the vehicle 100. The interface module 220 may receive information indicating that a passenger of the vehicle 100 would like to order food from a restaurant 211. As used herein, a restaurant 211 refers to any entity that sells food and is capable of receiving an order 293. The interface module 220 may provide an interface through which the passenger of the vehicle 100 may provide information indicative of a desired food item.

In one embodiment, the interface may be a touch interface and the passenger may provide the indication by touching the interface or typing a request into the interface. For example, the passenger may touch a user interface element labeled "order food" that is displayed in a touch interface provided on a display, or other input system 130, of the vehicle 100. In another embodiment, the interface may be a voice interface and the passenger may provide the indication by speaking. For example, the passenger may speak a command such as "order food" into a microphone, or other input system 130 of the vehicle 100. Any method or technique for processing voice commands may be used.

Note that while the system 170 is described with respect to food ordering and restaurants 211, it is not limited to ordering food or restaurants. The system 170 may be used to facilitate the ordering of any type of good or service from a vehicle 100. For example, the system 170 could be used to order items from a hardware store or a supermarket.

In some embodiments, the indication received from the passenger by the interface module 220 may include information about the request, such as desired type of restaurant 211 or name of a desired restaurant 211. For example, the passenger may speak indications such as "I'm hungry", "I would like to order Chinese food", or "I would like to eat at McDonalds". Other types of information may be included in the request by the passenger.

The mapping module 225 is configured to determine one more restaurants in response to the indication received from the passenger. In some embodiments, the mapping module 225 may locate the one or more restaurants by forming a query from the indication received from the passenger, and determining one or more restaurants that are responsive to the query. The mapping module 225 may determine one or more restaurants that are responsive to the query using map data 116 associated with the vehicle 100. The map data 116 may include names, locations, and descriptions of various restaurants or other businesses.

Alternatively or additionally, the mapping module 225 may determine one or more restaurants that are responsive to the query using restaurant data 280 associated with the vehicle 100. The restaurant data 280 may include names, locations, reviews and descriptions of various restaurants 211. The restaurant data 280 may be provided by the restaurants 211 to the vehicle 100 and stored in the database 240. Other information such as the food items or menu items that are available at each restaurant 211 may be included in the restaurant data 280.

Continuing the example described above, if the passenger provides the indication "I'm hungry", the mapping module 225 may form a generic query such as "restaurant" or "food". If the passenger provides the indication "I would like to order Chinese food", the mapping module 225 may form a more specific query such as "Chinese restaurant." If the passenger provides the indication "I would like to eat at McDonalds", the mapping module 225 may form a more specific query such as "McDonalds." Any method for forming a query may be used.

The mapping module 225 may be further configured to generate and include a location constraint in the formed query. In some embodiments, the location constraint may be based on the current location of the vehicle 100 and a distance threshold. The distance threshold may represent a maximum distance that the passenger will travel from the current location of the vehicle 100 to go to a restaurant 211. Example distance thresholds may include five miles, ten miles, etc. The distance threshold may be set by a user or administrator, or may be inferred based on past passenger behavior. For example, if a passenger typically drives at most two miles out of the way to go to a restaurant 211, the mapping module 225 may set the distance threshold at two miles. Any method for determining a distance threshold based on a passenger history may be used.

In some embodiments, the location constraint may be based on a current route being traveled by the vehicle 100. For example, the vehicle 100 may be traveling a route such as a route between a location associated with a job of the passenger and a location associated with a home of the passenger. Rather than use a location constraint that is based on the current location of the vehicle 100, the mapping module 225 may use a location constraint that is based on the various locations that make up the current route being traveled by the vehicle 100. Thus, continuing the example above, for the indication "Chinese restaurant" the mapping module 225 may generate a query for Chinese restaurants that are along the current route being traveled by the vehicle 100. Similar to the distance threshold, the maximum distance that the passenger may be willing to deviate from the current route may be set by a user or administrator or may be based on the past behavior of the passenger.

Whether or not the mapping module 225 searches for restaurants near the location of the vehicle 100, or the current route of the vehicle 100 may depend on context taken from the indication provided by the passenger. For example, if the passenger provides an indication with words associated with urgency or immediacy such as "ASAP", "now", or "close", the mapping module 225 may use the current location of the vehicle 100 as the location constraint. In contrast, if the passenger provides an indication with words or phrases associated with their destination or that do not show immediacy such as "on the way" or "for home", the mapping module 225 may use the current route of the vehicle as the location constraint.

After determining the one or more restaurants 211, the mapping module 225 may provide indicators of the one or more restaurants 211 to the interface module 220 to present them to the passenger. In some embodiments, the interface module 220 may display each of the one or more restaurants 211 to the passenger on a display associated with the vehicle 100. The interface module 220 may display indicators of each of the one or more restaurants 211 along with information about each of the one or more restaurants such as its location on a map and one or more reviews of the restaurant. The information about each restaurant 211 may be provided from the restaurant data 280. Any information that may be helpful for the passenger to select a restaurant 211 may be provided. Alternatively or additionally, the interface module 220 may speak the name of each of the one or more restaurants 211 to the passenger of the vehicle 100.

The interface module 220 may be further configured to receive a selection of a desired restaurant 211 of the one or more restaurants 211 presented to the passenger of the vehicle 100. The desired restaurant 211 may be the restaurant 211 where the passenger desires to order food from. Depending in the embodiment, the passenger may select the desired restaurant 211 by touching the name of the restaurant 211 on the display, or by speaking the name of the restaurant 211.

The interface module 220 may load a natural language understanding model 285 corresponding to the desired restaurant 211. Depending on the embodiment, each restaurant 211 may be associated with a natural language understanding model 285 that was trained using the particular menu items or food items that are offered by the particular restaurant 211. Any method for training a natural language understanding model 285 to recognize food items from a menu may be used. Each natural language understanding model 285 may have been provided by the associated restaurant 211, or may have been generated by the interface module 220 from a menu provided by the restaurant 211. In some implementations, the natural language understanding model 285 may be a natural language processing model. Other types of models may be used.

In some embodiments, if no natural language understanding model 285 corresponding to the desired restaurant 211 exists, the interface module 220 may load a generic natural language understanding model 285. The generic natural language understanding model 285 may have been trained to recognize typical or common food-related terms and phrases.

In other embodiments, voice models specific to particular styles or types of food may be loaded by the interface module 220. The interface module 220 may load a natural language understanding model 285 corresponding to the style or type of food that is served by the desired restaurant 211. For example, if the desired restaurant 211 is a Chinese restaurant, the interface module 220 may use a natural language understanding model 285 trained using menu items or food terms and phrases that are commonly associated with Chinese food. In another example, if the desired restaurant 211 is a Greek restaurant, the interface module 220 may use a natural language understanding model 285 trained using menu items or food terms and phrases that are commonly associated with Greek food.

After loading the appropriate natural language understanding model 285, the interface module 220 may begin to receive voice data 287 from the passenger. The voice data 287 may be a recording of the passenger speaking the food items that the passenger would like to receive from the desired restaurant 211. Depending on the embodiment, the interface module 220 may have presented a menu associated with the desired restaurant 211 to the passenger. For example, the interface module 220 may have displayed the menu to the passenger on the display associated with the vehicle 100, or the interface module 220 may have spoken the menu to the passenger through a speaker. The menu may have been provided by the desired restaurant 211, or may have been taken from the restaurant data 280.

The interface module 220 may be further configured to process the received voice data 287 using the loaded natural language understanding model 285 to generate an order 293 for the passenger. The order 293 may be a list of the food items that were selected by the passenger as evidenced by the voice data 287. Depending on the embodiment, after generating the order 293, the interface module 220 may read or display the order 293 to the passenger who may then make any corrections or additions.

In some embodiments, the voice data 287, rather than contain the actual recording of the user, may include text that was converted from the recording of the user. For example, the interface module 220 may have converted the words and phrases spoken by the user into text using any one of a variety of methods for converting spoken words into text. In such implementations, the natural language understanding model 285 may process the text from the voice data 287 to determine the order 293.

The transaction module 235 may provide the generated order 293 to the desired restaurant 211. The transaction module 235 may send the order 293 to the restaurant 211 using a wireless network connection between the vehicle 100 and the desired restaurant 211. Depending on the embodiment, the restaurant 211 may conform receipt of the order 293 and may provide information about the order 293 such as an estimate of when the order 293 will be ready for pickup by the vehicle 100.

The order 293 provided to the restaurant 211 may include an identifier 295 that may identify the vehicle 100 and/or passenger to the restaurant 211. Depending on the embodiment, the identifier 295 may be an account number assigned to the passenger and/or vehicle 100. Other information may be included in the order 293 such as a description (e.g., vehicle make and model, year, and color) of the vehicle 100 and a license plate number associated with the vehicle 100.

The transaction module 235 may be further configured to include an estimated time of arrival for the vehicle 100 at the desired restaurant 211. The transaction module 235 may calculate the estimated time of arrival for the vehicle 100 based on the current location of the vehicle 100 and the location of the desired restaurant 211. The transaction module 235 may further consider information such as map data 116, traffic data, and the current speed of the vehicle 100, for example. The estimated time of arrival may be included in the order 293 sent to the restaurant 211.

In some embodiments, the transaction module 235 may further include the voice data 287 (i.e., the recording of the passenger used to generate the order 293 or the text corresponding to the recording of the passenger) with the order 293. The restaurant 211 may listen to the voice data 287 to confirm or double-check the order 293. Furthermore, depending on the restaurant 211, the voice data 287 may be played to one or more employees associated with the restaurant 211 through a speaker associated with the restaurant 211. For example, the restaurant 211 may be a fast food restaurant with a drive-through window. When the order 293 is received, the voice data 287 may be played to an employee working the drive-through window through a speaker associated with the drive-through window. The employee may then enter the order as if the vehicle 100 had been at the drive-through window.

The transaction module 235 may further facilitate payment between the passenger and the restaurant 211 for the order 293. For example, the transaction module 235 may store a credit card, or other payment instrument, for the passenger. The transaction module 235 may charge the credit card associated with the user based on a price associated with the order 293, and may provide an indication of the amount charged to the desired restaurant 211. Depending on the embodiment, the transaction module 235 may facilitate payment such that the desired restaurant 211 does not receive or store the credit card number associated with the passenger. Any method for performing payment processing may be used.

In some embodiments, rather than immediately send the order 293 to the desired restaurant 211, the transaction module 235 may first determine the estimated time of arrival for the vehicle 100 at the restaurant 211 as described above. The transaction module 235 may then estimate how long the restaurant 211 will take to prepare the order 293, and may determine an optimal time to send the order to 293 to the desired restaurant 211 to ensure that the order 293 will be completed by the restaurant 211 at approximately the same time that the vehicle 100 arrives at the restaurant 211. The estimate of how long the restaurant 211 will take to prepare the order 293 may be based on information provided by the restaurant 211, may be based on restaurant data 280, or may be based on typical or average order preparation times for orders 293 from the desired restaurant 211 or other restaurants 211.

For example, the transaction module 235 may have received an order 293 for a fast-food restaurant 211. The transaction module 235 may determine that the estimated time of arrival for the vehicle 100 at the restaurant 211 is one hour, and that the restaurant 211 will take approximately fifteen minutes to prepare the order 293. Accordingly, the transaction module 235 may determine to send the order 293 to the restaurant 211 in forty-five minutes so that the order 293 will be completed when the vehicle 100 arrives at the restaurant 211 in one hour.

The arrival module 230 may be configured to determine that the vehicle 100 has arrived at the restaurant 211, and to inform the desired restaurant 211 that the vehicle has arrived. The arrival module 230 may determine that the vehicle 100 has arrived using a GPS or other location component. The arrival module 230 may inform the restaurant 211 that it has arrived by sending an electronic message or using another communication method. The message may include information that identifies the vehicle 100 such as the identifier 295, a description of the vehicle 100, and a location where the vehicle 100 is parked or waiting for the order 293. The restaurant 211 may then dispatch a food runner to the vehicle 100 to deliver the food corresponding to the order 293 to the vehicle 100.

Alternatively or additionally, the arrival module 230 may be located at the restaurant 211, and may determine when the vehicle 100 has arrived. In one embodiment, the arrival module 230 may determine that the vehicle 100 has arrived by receiving a low power signal associated with the vehicle 100. For example, the arrival module 230 may include an RFID reader, and the vehicle 100 may include an RFID transmitter that transmits the identifier 295 associated with the vehicle 100. Other technologies such as Bluetooth® or WiFi™ may be used.

In another embodiment, the arrival module 230 may determine that the vehicle 100 has arrived by reading the license plate number associated with the vehicle 100. For example, when the vehicle 100 enters a parking area associated with the restaurant 211 a camera may "read" the license plate numbers from the license plate of the vehicle 100 using text or character recognition techniques. Any method for determining license plate numbers from an image or video of a license plate may be used.

Figure 3:
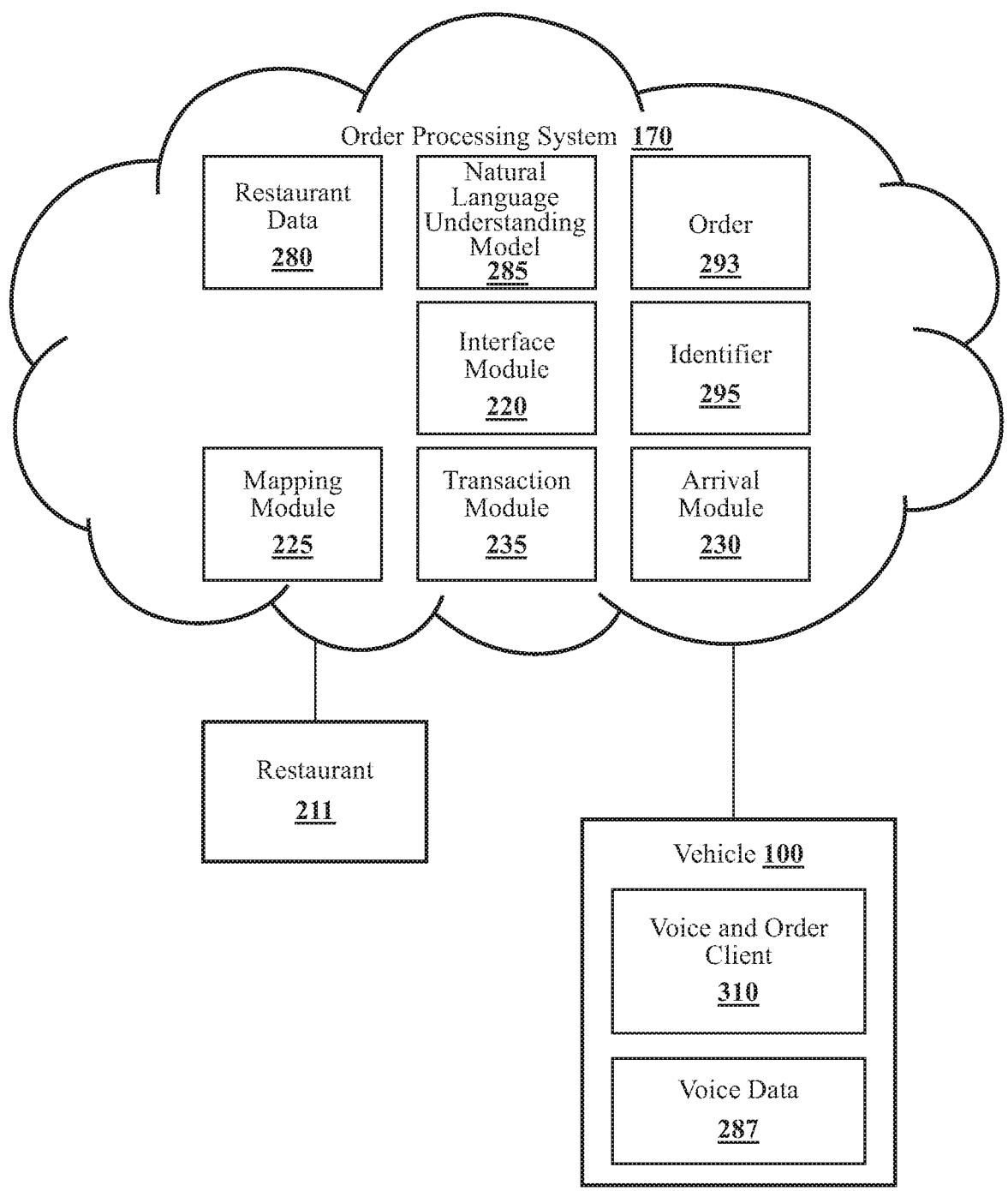
FIG. 3 illustrates a cloud based embodiment of an order processing system.

FIG. 3 is an illustration of a cloud based environment. Rather than implement the order processing system 170 in the vehicle 100 as shown in FIG. 2, in FIG. 3 the order processing system 170 is implemented by a cloud based computing environment. The cloud based computing environment may be a distributed computing environment consisting of multiple computing devices, processors, or servers.

Executing the order processing system 170 in the cloud, rather than the vehicle 100, may provide several advantages. First, the cloud may have greater computational resources than the vehicle 100, which may result in more accurate orders 293 and faster processing of voice data 287. Second, vehicles 100 having lesser or outdated processing capabilities may be able to use the order processing system 170 because the majority of the processing is performed at the cloud rather than the vehicle 100. Third, because the natural language understanding models 285 are stored and maintained by the cloud, rather than at each individual vehicle 100, each order 293 may be generated using the most current natural language understanding models 285 that are available.

In the example shown, the vehicle 100 may execute a voice and order client 310 that may interface with the order processing system 170 through a network such as the Internet. Any system, method, or technique for networking may be used.

Similar as described above, the user or passenger of the vehicle 100 may say or speak information corresponding to an order. The voice and order client 310 may record the spoken information as voice data 287, and may provide the voice data 287 to the interface module 220 of the order processing system 170 of the cloud based computing environment. Depending on the embodiment, the voice and order client 310 may generate text from the voice data 287. The interface module 220 may then generate the order 293 using the text and a natural language understanding model 285 associated with the restaurant 211 as described previously with respect to FIG. 2. The order processing system 170 may then provide the generated order 293 to the restaurant 211 through the network. The order processing system 170 may further provide the order 293 to the voice and order client 310 through the network, and the order 293 may be displayed to the user or passenger in the vehicle 100.

Note that depending on the embodiment some of the components of the order processing system 170 may be executed by the vehicle 100 rather than by the cloud. For example, the vehicle 100 may execute the mapping module 225 and the arrival module 230. Other configurations and distributions of components between the order processing system 170 and the vehicle 100 may be supported.

Figure 4:
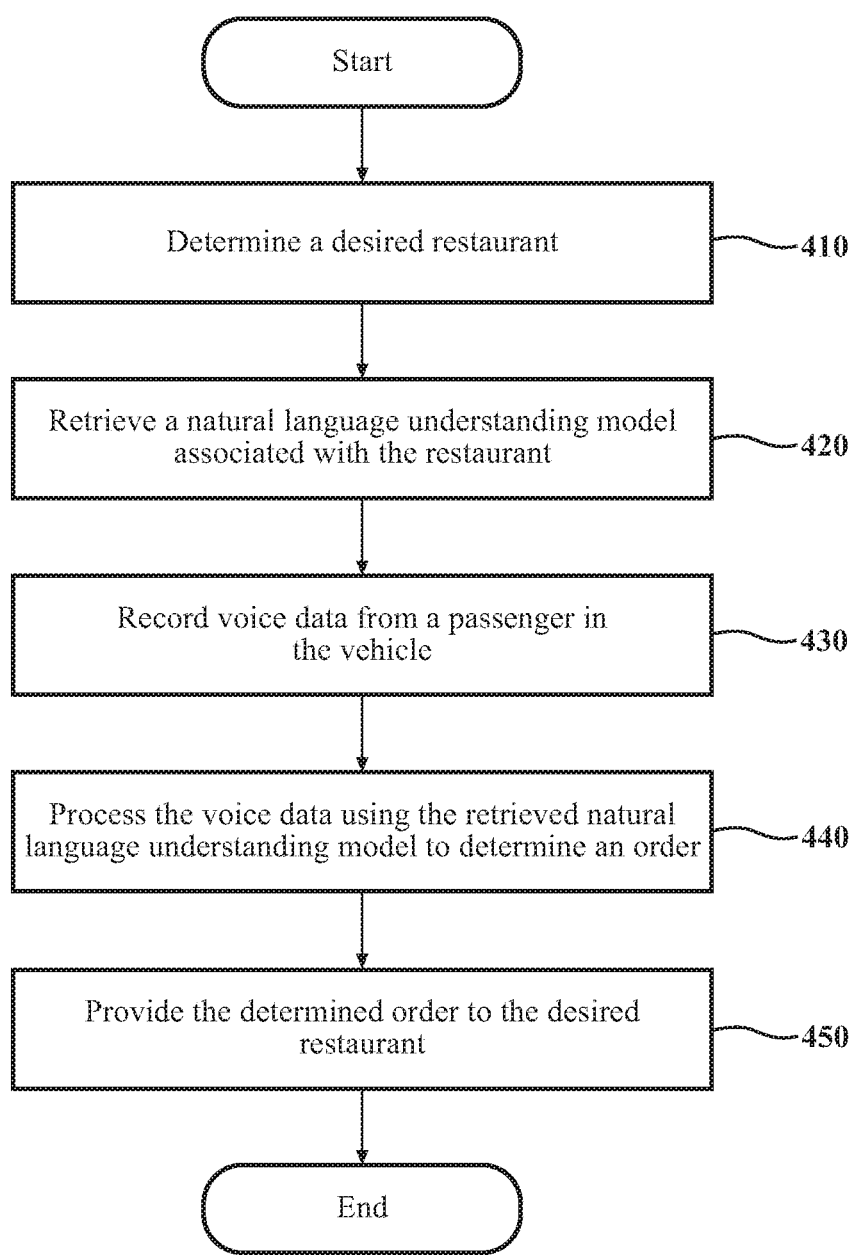
FIG. 4 illustrates a flowchart of a method that is associated with ordering food from a vehicle.

Additional aspects of ordering food from vehicles will be discussed in relation to FIG. 4. FIG. 4 illustrates a flowchart of a method that is associated with ordering food from a vehicle 100. The method will be discussed from the perspective of the order processing system 170 of FIGS. 1, 2, and 3. While the method is discussed in combination with the order processing system 170, it should be appreciated that the method is not limited to being implemented within the order processing system 170 but is instead one example of a system that may implement the method.

At 410, the interface module 220 determines a desired restaurant 211. Depending on the embodiment, a passenger in a vehicle 100 may select or speak the name of the desired restaurant 211 inside the vehicle 100. The desired restaurant 211 may have been selected by the passenger from a plurality of restaurants 211 that are near the current location of the vehicle 100, or along a current route being traveled by the vehicle 100. For example, the passenger may have expressed a desire to pick up dinner on the way home from work. In response, the interface module 220 presented (e.g., spoke or displayed) the plurality of restaurants 211 to the passenger. The passenger may have then selected desired restaurant 211 from among those presented.

At 420, the interface module 220 retrieves a voice model associated with the restaurant 211. The interface module 220 may retrieve the natural language understanding model 285 associated with the desired restaurant 211 from among a plurality of voice models stored in the database 240. Each natural language understanding model 285 may be associated with a different restaurant 211, and may have been trained to recognize words and phrases that are associated with menu items or food items that are offered and sold by the associated restaurant 211. Any method for training a natural language understanding model 285 may be used.

At 430, the interface module 220 records voice data 287 from the passenger in the vehicle 100. The interface module 220 may record the voice data 287 using one more microphones associated with the vehicle 100. The recorded voice data 287 may be a recording of the passenger speaking the food items that she would like to order from the desired restaurant 211. Any method for recording voice data 287 may be used. Depending on the embodiment, the interface module 220 may further process the recording to generate text data, and the voice data 287 may include the generated text data.

At 440, the interface module 220 processes the voice data 287 using the retrieved natural language understanding model 285 to determine an order 293. The order 293 may identify the food items spoken by the passenger in the voice data 287. In some embodiments, the order 293 may further include an identifier 295 that that uniquely identifies one or both of the passenger or the vehicle 100, the voice data 287, and an estimated time of arrival of the vehicle 100 at the restaurant 211. Depending on the embodiment, the voice data 287 may be text generated from the recording, and the interface module 220 may process the text using the natural language understanding model 285.

At 450, the transaction module 235 provides the determined order 293 to the desired restaurant 211. The transaction module 235 may provide the determined order 293 to the desired restaurant 211 through a wireless networking connection between the vehicle 100 and the restaurant 211. Any type of wireless networking technology may be used.

Figure 5:
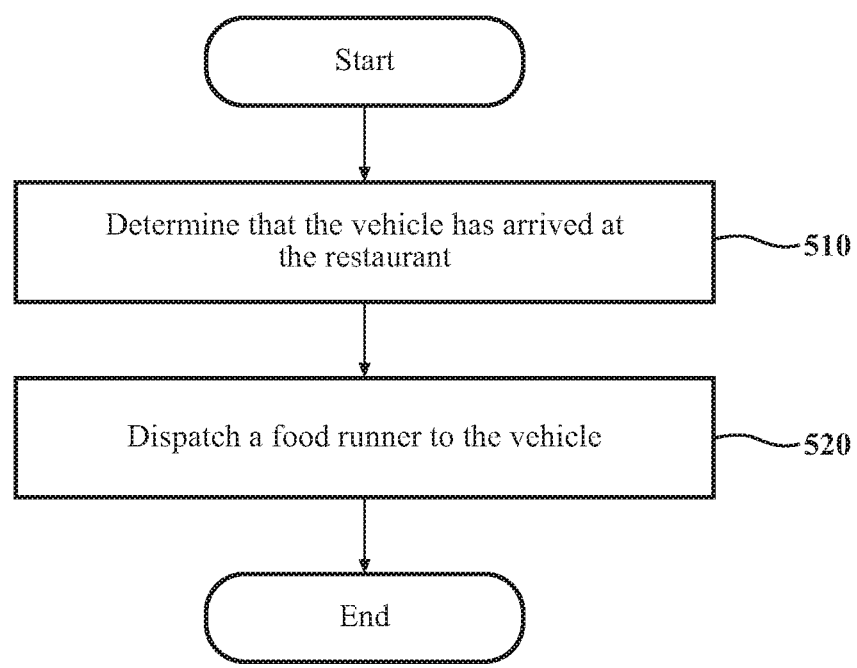
FIG. 5 illustrates a flowchart of a method that is associated with dispatching a food runner to a vehicle.

Additional aspects of ordering food from vehicles will be discussed in relation to FIG. 5. FIG. 5 illustrates a flowchart of a method that is associated with dispatching a food runner to a vehicle. The method will be discussed from the perspective of the order processing system 170 of FIGS. 1, 2, and 3. While the method is discussed in combination with the order processing system 170, it should be appreciated that the method is not limited to being implemented within the order processing system 170 but is instead one example of a system that may implement the method.

At 510, the arrival module 230 determines that the vehicle 100 has arrived at the restaurant 211. The vehicle 100 may be associated with an order 293 that was received by the restaurant 211 from the vehicle 100. In one embodiment, the arrival module 230 may determine that the vehicle 100 has arrived at the restaurant 211 using GPS or some other location determination technology. In another embodiment, the arrival module 230 may determine that the vehicle 100 has arrived based on a signal received from a low energy wireless technology such as RFID or Bluetooth®. The arrival module 230 may determine that the vehicle 100 has arrived based on the identifier 295 that identifies the vehicle 100 in the received signal. In yet another embodiment, the arrival module 230 may determine that the vehicle 100 has arrived based on an image of the vehicle 100 that includes a license plate number. The arrival module 230 may read the license plate number using any method or technique for reading license plate numbers or other text.

At 520, the arrival module 230 dispatches a food runner to the vehicle 100. In response to determining that the vehicle 100 has arrived at the restaurant 211, the arrival module 230 may dispatch a food runner to the vehicle 100 with the food items corresponding to the order 293. The food runner may be a person or a robot, for example. The food runner may determine the vehicle 100 based on descriptive information provided to the restaurant 211 in the order 293.

Figure 6:
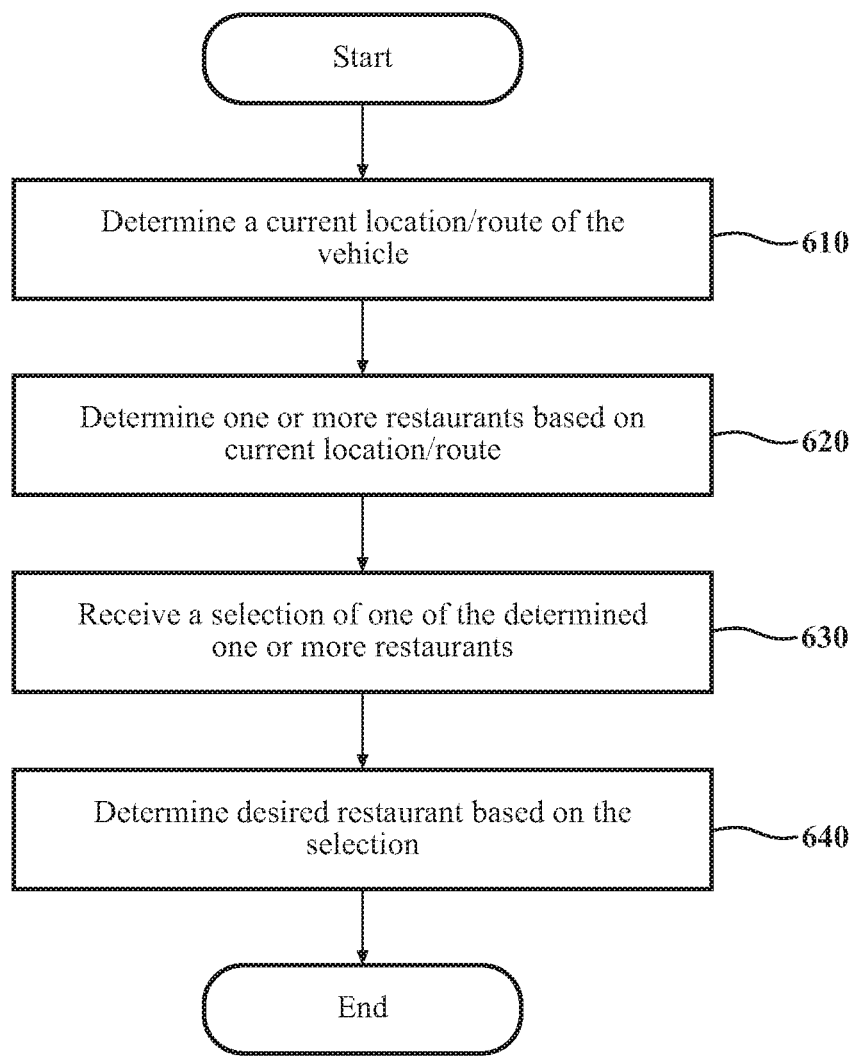
FIG. 6 illustrates a flowchart of a method that is associated with determining a desired restaurant.

Additional aspects of ordering food from vehicles will be discussed in relation to FIG. 6. FIG. 6 illustrates a flowchart of a method that is associated with determining a desired restaurant 211. The method will be discussed from the perspective of the order processing system 170 of FIGS. 1, 2, and 3. While the method is discussed in combination with the order processing system 170, it should be appreciated that the method is not limited to being implemented within the order processing system 170 but is instead one example of a system that may implement the method.

At 610, the mapping module 225 determines a current location of the vehicle 100 or a route being traveled by the vehicle 100. The mapping module 225 may determine the current location of the vehicle 100 using a GPS or other location determination component. The mapping module 225 may determine a current route for the vehicle 100 from the navigation system 147 associated with the vehicle 100. The route being traveled by the vehicle 100 may have an origin location and a destination location. For example, the vehicle 100 may be traveling a route between a work location and a home location associated with the passenger of the vehicle 100.

At 620, the mapping module 225 determines one or more restaurants 211 based on the current location of the vehicle 100 or the route being traveled by the vehicle 100. In some embodiments, the mapping module 225 may determine restaurants 211 that are within a threshold distance of the current location of the vehicle 100 or the route being traveled by the vehicle 100. The mapping module 225 may determine the restaurants 211 from restaurant data 280 that may include the addresses of a plurality of restaurants 211. Alternatively or additionally, the mapping module 225 may determine the one or more restaurants 211 based on map data 116 associated with the vehicle 100.

At 630, the interface module 220 receives a selection of one of the determined one or more restaurants 211. The interface module 220 may receive the selection through one or both of a touch interface or a voice interface provided by the vehicle 100. For example, the interface module 220 may display icons representing each of the determined one or more restaurants 211 to the passenger, and the passenger may select one of the displayed icons. In another example, the interface module 220 may speak the names of the determined one or more restaurants 211 to the passenger, and the passenger may select one of the determined one or more restaurants 211 by speaking its name.

At 640, the interface module 220 determines the desired restaurant 211 based on the selection. The interface module 220 may determine the desired restaurant 211 based on the selection, and in response may load a natural language understanding model 285 corresponding to the desired restaurant 211.

Figure 7:
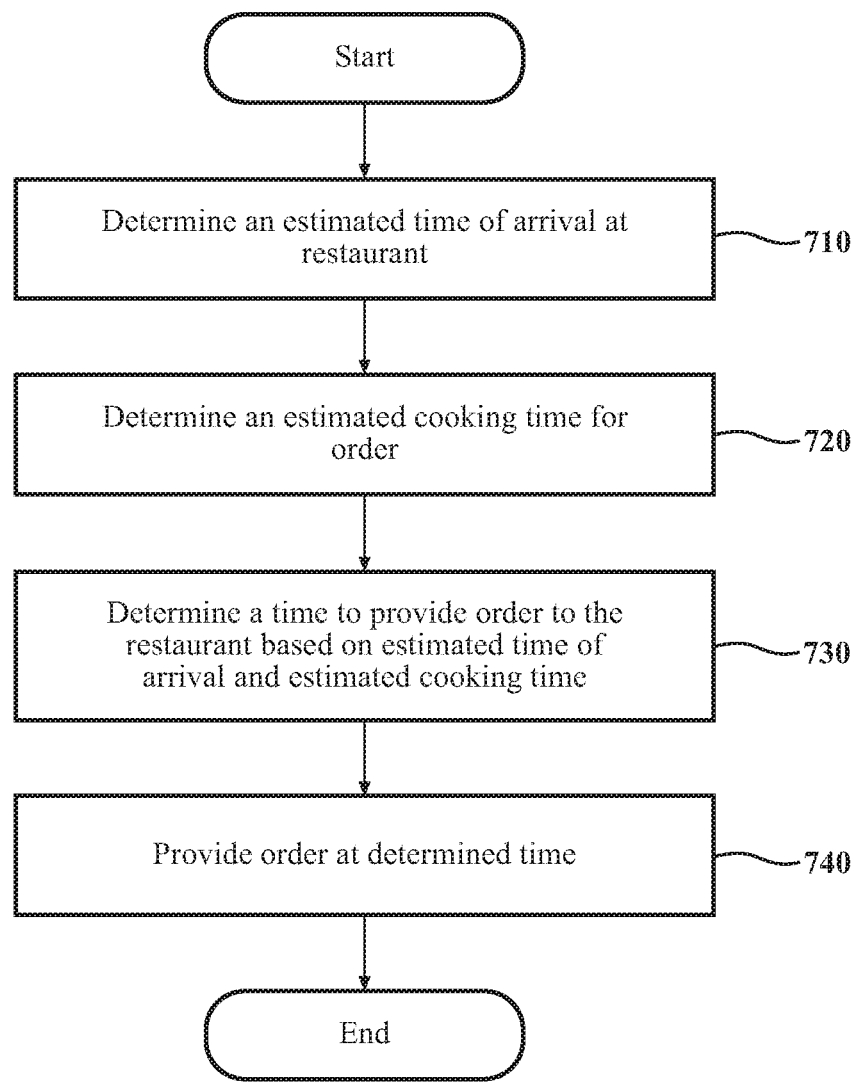
FIG. 7 illustrates a flowchart of a method that is associated with determining when to provide an order to a restaurant from a vehicle.

Additional aspects of ordering food from vehicles will be discussed in relation to FIG. 7. FIG. 7 illustrates a flowchart of a method that is associated with determining when to provide an order to a restaurant 211 from a vehicle 100. The method will be discussed from the perspective of the order processing system 170 of FIGS. 1, 2 and 3. While the method is discussed in combination with the order processing system 170, it should be appreciated that the method is not limited to being implemented within the order processing system 170 but is instead one example of a system that may implement the method.

At 710, the transaction module 235 determines an estimated time of arrival for the vehicle 100 at the restaurant 211. The transaction module 235 may determine the estimated time of arrival for the vehicle 100 at the restaurant 211 based on the current location of the vehicle 100 and the location of the restaurant 211. The transaction module 235 may determine the estimated time of arrival using map data 116 associated with the vehicle 100, the current speed of the vehicle 100, and other information such as traffic or weather data.

At 720, the transaction module 235 determines an estimated cooking time for the order 293. The transaction module 235 may determine the estimated cooking time for the order 293 from restaurant data 280 associated with the restaurant 211. For example, the restaurant 211 may have provided an estimated cooking time for each item on the menu. Alternatively, the transaction module 235 may estimate the cooking time based on historical cooking times observed for the restaurant 211 or other similar restaurants 211.

At 730, the transaction module 235 determines a time to provide the order 293 to the restaurant 211 based on the estimated time of arrival and the estimated cooking time. The transaction module 235 may determine the time to provide the order 293 such that the order 293 is received and prepared at approximately the same time that the vehicle 100 arrives at the restaurant 211 to pick up the order 293.

At 740, the transaction module 235 provides the order 293 at the determined time.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the order processing system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the order processing system 170, and/or the autonomous driving module(s) 160 may control some or all of these vehicle systems 140 and, thus, may be partially or fully autonomous.

The processor(s) 110, the order processing system 170, and/or the autonomous driving module(s) 160 can be operatively connected to communicate with the various vehicle systems 140 and/or individual components thereof. For example, returning to FIG. 1, the processor(s) 110, the order processing system 170, and/or the autonomous driving module(s) 160 can be in communication to send and/or receive information from the various vehicle systems 140 to control the movement, speed, maneuvering, heading, direction, etc. of the vehicle 100. The processor(s) 110, the order processing system 170, and/or the autonomous driving module(s) 160 may control some or all of these vehicle systems 140.

The processor(s) 110, the order processing system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the order processing system 170, and/or the autonomous driving module(s) 160 can control the direction and/or speed of the vehicle 100. The processor(s) 110, the order processing system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the order processing system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for ordering food in a vehicle, the system comprising:
   one or more processors; and
   a memory communicably coupled to the one or more processors and storing:
      an interface module including instructions that when executed by the one or more processors cause the one or more processors to:
         retrieve a natural language voice understanding model associated with a desired restaurant, wherein the natural language voice understanding model is one of a plurality of natural language voice understanding models, and each natural language voice understanding model is associated with a corresponding restaurant of a plurality of restaurants and has been trained to recognize at least one of a menu item or a food item offered by the corresponding restaurant;
         record voice data from a passenger in the vehicle, wherein the voice data include at least one of a menu item or a food item offered by the desired restaurant, and wherein the voice data preclude a need for the passenger to use a touchable interface to identify the at least one of the menu item or the food item offered by the desired restaurant; and process the voice data using the natural language voice understanding model to determine an order for the desired restaurant, wherein an identification, in the order, of the at least one of the menu item or the food item offered by the desired restaurant is more accurate than an identification, in the voice data, of the at least one of the menu item or the food item offered by the desired restaurant; and a transaction module including instructions that when executed by the one or more processors cause the one or more processors to:

determine an estimated time of arrival of the vehicle at the desired restaurant;

estimate a duration of time for the desired restaurant to prepare the at least one of the menu item or the food item included in the order;

determine a transmission time for the order, the transmission time being a time that is a difference of the duration of time subtracted from the estimated time of arrival; and send, at the transmission time, the order to the desired restaurant.

2. The system of claim 1, further comprising an arrival module including instructions that when executed by the one or more processors cause the one or more processors to:

determine that the vehicle has arrived at the desired restaurant; and dispatch a food runner to take one or more food items corresponding to the order to the vehicle in response to a determination that the vehicle has arrived at the restaurant.

3. The system of claim 2, wherein the instructions of the arrival module that cause the one or more processors to determine that the vehicle has arrived at the desired restaurant comprise instructions that cause the one or more processors to recognize a license plate number associated with the vehicle in an image or a video.

4. The system of claim 2, wherein the instructions of the arrival module that cause the one or more processors to determine that the vehicle has arrived at the desired restaurant comprise instructions that cause the one or more processors to receive a signal associated with the vehicle.

5. The system of claim 4, wherein the signal comprises one or more of a Bluetooth® signal, a WiFi™ signal, or an RFID signal.

6. The system of claim 1, further comprising a mapping module including instructions that when executed by the one or more processors cause the one or more processors to:

determine a current location of the vehicle;

determine one or more restaurants of the plurality of restaurants that are within a threshold distance of the vehicle;

present the one or more restaurants to the passenger of the vehicle;

receive a selection of one of the one or more restaurants; and determine the desired restaurant based on the selection.

7. The system of claim 1, further comprising a mapping module including instructions that when executed by the one or more processors cause the one or more processors to:

determine a current route of the vehicle;

determine one or more restaurants of the plurality of restaurants that are along the current route;

present the one or more restaurants to the passenger of the vehicle;

receive a selection of one of the one or more restaurants; and determine the desired restaurant based on the selection.

8. A method for ordering food in a vehicle, the method comprising:

receiving, by an interface module, a desired restaurant;

retrieving, by the interface module, a natural language voice understanding model associated with the desired restaurant, wherein the natural language voice understanding model is one of a plurality of natural language voice understanding models, and each natural language voice understanding model is associated with a corresponding restaurant of a plurality of restaurants and has been trained to recognize at least one of a menu item or a food item offered by the corresponding restaurant;

recording, by the interface module, voice data from a passenger in the vehicle, wherein the voice data include at least one of a menu item or a food item offered by the desired restaurant, and wherein the voice data preclude a need for the passenger to use a touchable interface to identify the at least one of the menu item or the food item offered by the desired restaurant;

processing, by the interface module, the voice data using the natural language voice understanding model to determine an order for the desired restaurant, wherein an identification, in the order, of the at least one of the menu item or the food item offered by the desired restaurant is more accurate than an identification, in the voice data, of the at least one of the menu item or the food item offered by the desired restaurant;

determining, by a transaction module, an estimated time of arrival of the vehicle at the desired restaurant;

estimating, by the transaction module, a duration of time for the desired restaurant to prepare the at least one of the menu item or the food item included in the order;

determining, by the transaction module, a transmission time for the order, the transmission time being a time that is a difference of the duration of time subtracted from the estimated time of arrival; and sending, by the transaction module and at the transmission time, the order to the desired restaurant, wherein the interface module and the transaction module:

are stored on a memory communicably coupled to one or more processors, and include instructions that when executed by the one or more processors cause the one or more processors to perform the method.

9. The method of claim 8, further comprising:

determining, by an arrival module, that the vehicle has arrived at the desired restaurant; and dispatching, by the arrival module, a food runner to take one or more food items corresponding to the order to the vehicle in response to a determination that the vehicle has arrived at the desired restaurant, wherein the arrival module is stored on the memory and includes instructions that when executed by the one or more processors, in conjunction with the interface module and the transaction module, cause the one or more processors to perform the method.

10. The method of claim 9, wherein the determining that the vehicle has arrived at the desired restaurant comprises recognizing a license plate number associated with the vehicle in an image or a video.

11. The method of claim 9, wherein the determining that the vehicle has arrived at the desired restaurant comprises receiving a signal associated with the vehicle.

12. The method of claim 11, wherein the signal comprises one or more of a Bluetooth® signal, a WiFi® signal, or an RFID signal.

13. The method of claim 8, wherein determining the desired restaurant comprises:
   determining, by a mapping module, a current location of the vehicle;
   determining, by the mapping module, one or more restaurants of the plurality of restaurants that are within a threshold distance of the vehicle;
   presenting, by the mapping module, the one or more restaurants to the passenger of the vehicle;
   receiving, by the mapping module, a selection of one of the one or more restaurants; and
   determining, by the mapping module, the desired restaurant based on the selection,
   wherein the mapping module is stored on the memory and includes instructions that when executed by the one or more processors, in conjunction with the interface module and the transaction module, cause the one or more processors to perform the method.

14. The method of claim 8, wherein determining the desired restaurant comprises:
   determining, by a mapping module, a current route of the vehicle;
   determining, by the mapping module, one or more restaurants of the plurality of restaurants that are along the current route;
   presenting, by the mapping module, the one or more restaurants to the passenger of the vehicle;
   receiving, by the mapping module, a selection of one of one or more restaurants; and
   determining, by the mapping module, the desired restaurant based on the selection,
   wherein the mapping module is stored on the memory and includes instructions that when executed by the one or more processors, in conjunction with the interface module and the transaction module, cause the one or more processors to perform the method.

15. The method of claim 8, further comprising facilitating, by the transaction module, payment for the order.

16. The method of claim 8, further comprising providing, by the transaction module, the estimated time of arrival to the desired restaurant.

17. A non-transitory computer-readable medium for ordering food in a vehicle and including instructions that when executed by one or more processors cause the one or more processors to:
   determine a desired restaurant;
   retrieve a natural language voice understanding model associated with the desired restaurant, wherein the natural language voice understanding model is one of a plurality of natural language voice understanding models, and each natural language voice understanding model is associated with a corresponding restaurant of a plurality of restaurants and has been trained to recognize at least one of a menu item or a food item offered by the corresponding restaurant;
   record voice data from a passenger in the vehicle, wherein the voice data include at least one of a menu item or a food item offered by the desired restaurant, and wherein the voice data preclude a need for the passenger to use a touchable interface to identify the at least one of the menu item or the food item offered by the desired restaurant;
   process the voice data using the natural language voice understanding model to determine an order for the desired restaurant, wherein an identification, in the order, of the at least one of the menu item or the food item offered by the desired restaurant is more accurate than an identification, in the voice data, of the at least one of the menu item or the food item offered by the desired restaurant;
   determine an estimated time of arrival of the vehicle at the desired restaurant;
   estimate a duration of time for the desired restaurant to prepare the at least one of the menu item or the food item included in the order;
   determine a transmission time for the order, the transmission time being a time that is a difference of the duration of time subtracted from the estimated time of arrival; and
   send, at the transmission time, the order to the desired restaurant.

18. The non-transitory computer-readable medium of claim 17, wherein the instructions that when executed by the one or more processors cause the one or more processors to determine the desired restaurant further comprise instructions that when executed by the one or more processors cause the one or more processors to:
   determine a current location of the vehicle;
   determine one or more restaurants of the plurality of restaurants that are within a threshold distance of the vehicle;
   present the one or more restaurants to the passenger of the vehicle;
   receive a selection of one of the one or more restaurants; and
   determine the desired restaurant based on the selection.

19. The non-transitory computer-readable medium of claim 17, wherein the instructions that when executed by the one or more processors cause the one or more processors to determine the desired restaurant further comprise instructions that when executed by the one or more processors cause the one or more processors to:
   determine a current route of the vehicle;
   determine one or more restaurants of the plurality of restaurants that are along the current route;
   present the one or more restaurants to the passenger of the vehicle;
   receive a selection of one of the one or more restaurants; and
   determine the desired restaurant based on the selection.

* * * * *